May 24, 1960     C. E. STRECKER     2,938,144
APPARATUS FOR STARTING AND OPERATING FLUORESCENT LAMPS
Filed Dec. 13, 1957
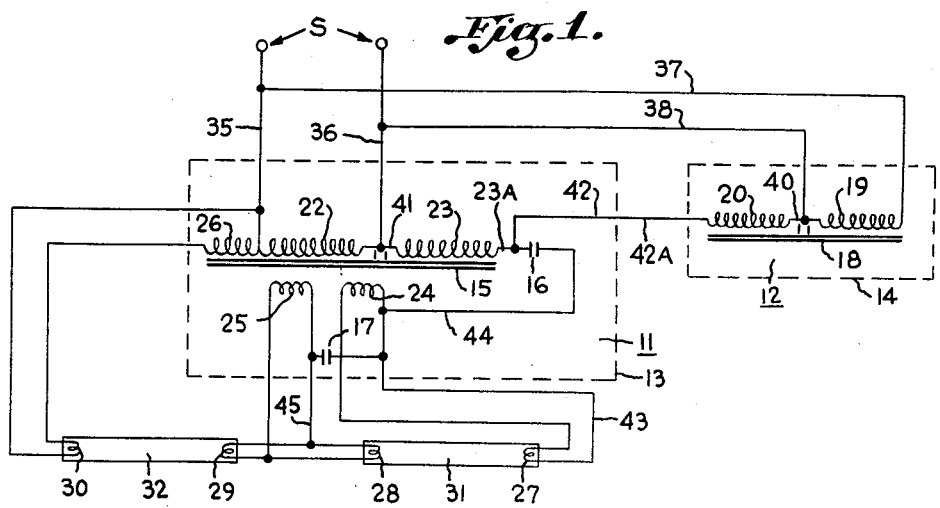
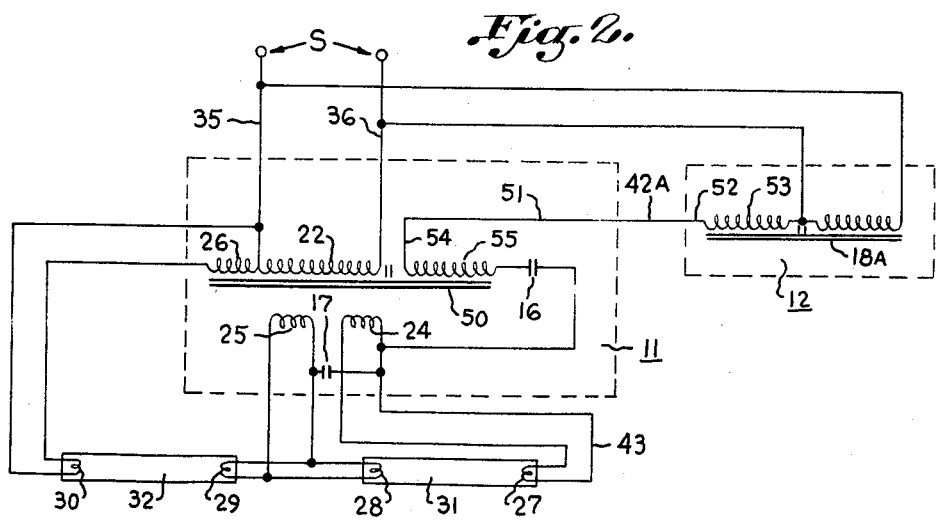
INVENTOR.
CHARLES E. STRECKER
BY Martin Kalikow
ATTORNEY United States Patent Office 2,938,144
Patented May 24, 1960

2,938,144
APPARATUS FOR STARTING AND OPERATING FLUORESCENT LAMPS

Charles E. Strecker, Danville, Ill., assignor to General Electric Company, a corporation of New York Filed Dec. 13, 1957, Ser. No. 702,577

13 Claims. (Cl. 315—97)

My invention relates to reactor apparatus and circuits commonly known as "ballasts" for starting and operating fluorescent lamps.

New continuously heated hot cathode type fluorescent lamps, such as those known as "power groove" lamps, which have unusually high wattage rating require large and heavy ballasting apparatus. For example, conventional ballasts such as described in my Patent 2,796,554 for starting and operating a pair of serially connected continuously heat fluorescent lamps of the 96 inch power groove type would need to be about two feet long and weigh about 25 pounds if constructed in a single unit to provide the required output voltages and currents. The difficulties and dangers inherent in handling such heavy and unwieldy devices both during installation and replacement are apparent. Moreover, their large size and weight would usually require specially designed and reinforced fixtures. In addition, the rate of heat generated in such large ballasts creates a problem in providing sufficient heat dissipation to meet industry heating standards.

Accordingly, an object of the invention is to provide ballasting apparatus for high wattage fluorescent lamps which can be easily handled during installation and replacement, which permit greater heat dissipation from the ballasts, and which do not require special fixtures. In furtherance of this latter object, it is a further object of the invention to provide a pair of smaller and lighter reactor devices which can, if desired, be located remote from one another, and a circuit for connecting these smaller devices together to form ballasting apparatus which can start and operate a pair of serially connected, continuously heated, high wattage type fluorescent lamps.

In general, in accord with the invention, a pair of reactor devices are provided, a first one of these devices including a high reactance transformer having a primary winding and a secondary winding; and a second one of these devices including a high reactance transformer having a primary winding, a secondary winding, and a plurality of heating windings for connection to the filaments of the high wattage lamps. The second device preferably also includes starting and power factor correcting capacitors. The devices are preferably separately housed and the first device is connected to the second device in a manner serving to boost the output of the second device so as to provide the required starting and operating voltages and currents for the lamps.

The novel features believed characteristic of the invention are set forth in the appended claims. The invention, itself, together with further objects and advantages thereof may be easily understood by referring to the following description taken in connection with the accompanying drawing in which:

Figure 1 is a schematic circuit diagram of ballasting apparatus embodying one form of the invention; and Figure 2 is a schematic circuit diagram of another embodiment of the invention whereby the apparatus will fail-safe without overheating if any of the primary or secondary windings of the transformers should open.

Referring to Figure 1, the invention is shown in one form as comprising ballasting apparatus including two reactor devices 11 and 12 separately housed within casings 13 and 14 respectively. Device 11 includes a high reactance transformer 15, a power factor correcting capacitor 16 and a starting capacitor 17. Device 12 includes a high reactance transformer 18 having a primary winding 19 and a secondary winding 20.

High reactance transformer 15 of the reactor device 11 includes a primary winding 22, a secondary winding 23 and a plurality of heating windings 24, 25 and 26 having external leads for connection to the filaments 27, 28 and 29 and 30 of two serially connected high wattage lamps 31 and 32; heating winding 24 being connected to filament 27, heating winding 25 being connected to filaments 28 and 29 in parallel, and heating winding 26 being connected to filament 30. Heating winding 26 may be an extension of primary winding 22, as shown. High reactance transformer 15 may, for example, be constructed in the manner shown in aforementioned U.S. Patent 2,796,554.

In accord with the invention, primary winding 22 of transformer 15 is connected through external input leads 35, 36 to a source S of alternating voltage, for example, 115 volts of a frequency of 60 cycles. Primary winding 19 is also connected through external input leads 37, 38 to source S whereby primary windings 19 and 22 are connected in parallel with one another. In the circuit of Figure 1, secondary winding 20 of transformer 18 is connected by internal conductor 40 in autotransformer relation with primary winding 19, and secondary winding 23 of transformer 15 is connected by internal conductor 41 in autotransformer relation with primary winding 22. The secondary windings 20 and 23 are also connected in parallel with one another; at the low voltage end by leads 38 and 36 connected to internal conductors 40 and 41 respectively, and at the high voltage end by conductor 42 having an external lead portion 42A. Power factor correcting capacitor 16 is connected within the device 11 between the high voltage end 23A of secondary winding 23 and an external high voltage lead 43 by means of an internal conductor 44 connected between one end of capacitor 16 and one end of heating winding 24. Starting capacitor 17 is connected within device 11 between the high voltage lead 43 and an intermediate voltage lead 45 also connected to one end of heating winding 25. Each of the autotransformers 15 and 18 are constructed to have a turns ratio and impedance approximately equal to one another and sufficient to provide the required open circuit starting voltage for the serially connected lamps 31, 32. The magnetic cores and arrangements of the windings on these cores are preferably such as to provide substantially the same leakage reactance in transformer 18 as that produced in transformer 15. Capacitor 16 is selected to have sufficient capacity to deliver to lamps 31 and 32 the combined output currents developed by autotransformers 15 and 18. Typical ballast apparatus for starting and operating two serially connected 96PG17 type power groove lamps in accord with Figure 1 may comprise autotransformers 15 and 18 each having a primary winding formed of #21 copper wire with a diameter of .0285" and secondary windings formed of #23 copper wire with a diameter of .0226 inch; primary winding 19 having 368 turns, secondary winding 20 having 1970 turns, primary winding 22 having 368 turns, and secondary winding 23 having 1970 turns. Power factor correcting capacitor 16 may have a capacity of 6.0 microfarads and a voltage rating of 700 volts and starting capacitor 17 may have a capacity of .075 microfarad and a voltage rating of 700 volts. Autotransformer 15 is constructed to have a leakage reactance of 1180 ohms while autotransformer 18 is constructed to have a leakage reactance of 1180 ohms. Transformers 15 and 18 produce an open circuit voltage between high voltage lead 43 and primary lead 35 of 520 volts; and the operating current through lamps 31, 32 is 1.5 amperes.

Referring now to Figure 2, there is shown another embodiment of the invention which permits greater freedom in the design of the secondary windings of the transformers of devices 11 and 12 and also insures that the lamps will not light and possibly damage themselves or the ballasting apparatus if one of the transformer windings should open or be disconnected. In the circuit of Figure 2, an isolated secondary high reactance transformer 50 replaces the autotransformer 15, and a series connection is made by lead 51 between the high voltage end 52 of the secondary winding 53 of autotransformer 18A and the low voltage end 54 of the isolated secondary winding 55 of transformer 50. Secondary windings 53 and 55 are of greater diameter wire but of fewer turns than secondary windings 20 and 23 of the apparatus of Figure 1. The remainder of the apparatus and circuit is identical with that described above in connection with Figure 1. The total open circuit starting voltage developed by transformers 18A and 50 of Figure 2 is equal to the voltage of source S plus the voltages developed by both secondary windings 53 and 55 in series. Since these windings 53 and 55 are in series it is not necessary that they have approximately the same impedance nor that transformers 18A and 50 have the same leakage reactance. Moreover, if either of the primary or secondary windings of transformers 18A or 50 should open or become disconnected, this total open circuit voltage would become insufficient to start the lamps. Typical apparatus for starting and operating two serially connected type power groove fluorescent lamps in accord with the circuit of Figure 2 comprises an autotransformer 18A having a primary winding of 368 turns of #21 copper wire and a secondary winding 53 of 813 turns of .0302" diameter copper wire. The isolated transformer 50 may have a primary winding of 368 turns of #21 copper wire and a secondary winding 55 of 813 turns of .0302" diameter copper wire. Capacitors 16 and 17 may have the same voltage and capacity rating as described above in connection with Figure 1 and the transformers deliver the same starting voltage and operating current to the lamps 31 and 32. Autotransformer 18A may be constructed to have a leakage reactance of 300 ohms while isolated transformer 50 may be constructed to have a leakage reactance of 300 ohms. Although devices 11 and 12 are shown as being separately housed in order to obtain the advantages of smaller individual size and weight, they may, for some applications be placed in the same housing.

Although I have described the above specific embodiments of the invention, many modifications may be made and I intend by the appended claims to cover all such modifications as fall within the true spirit and scope of the invention.

What I claim as new and desire to secure by Letters Patent of the United States is:

1. Ballasting apparatus for high power hot cathode fluorescent lamps comprising at least two devices each having a high reactance transformer with a primary winding and a secondary winding, said primary windings being connected in parallel with one another, a first lead connected in circuit with the secondary winding of one device and having an external portion for delivering output high voltage to the lamps, a second lead connected between said devices and in circuit with the secondary windings of both transformers for interconnecting said secondary windings to deliver their combined electrical outputs to said first lead, and a plurality of lamp cathode heating windings on the transformer of only one of said devices.

2. The ballasting apparatus of claim 1 wherein said secondary windings are connected directly in parallel with one another.

3. The ballasting apparatus of claim 1 wherein said secondary windings are connected in series with one another.

4. Ballasting apparatus for high power hot cathode fluorescent lamps comprising at least two separately housed devices each having a high reactance transformer with a primary winding and a secondary winding, said primary windings being connected in parallel with one another, a first lead connected in circuit with the secondary winding of one device and having an external portion for delivering output high voltage to the lamps, a second lead connected between said devices and in circuit with the secondary windings of both transformers for interconnecting said secondary windings to deliver their combined electrical outputs to said first lead, and a plurality of lamp cathode heating windings on the transformer of only one of said devices.

5. The ballasting apparatus of claim 4 including a power factor correcting capacitor connected in series with said first lead.

6. Ballasting apparatus for high power hot cathode fluorescent lamps comprising two separately housed devices each having a high reactance transformer with a primary winding and a secondary winding, said primary windings being connected in parallel with one another, a capacitor within one device connected in circuit with the secondary winding of the transformer of said one device, a first lead connected between said devices and in circuit with the secondary windings of both transformers for interconnecting said secondary windings to deliver their combined outputs to said capacitor, a second lead connected to said capacitor and having an external portion for delivering output high voltage to the lamps, and a plurality of heating windings on the transformer of said one device for delivering heating voltage to the filaments of said lamps.

7. Ballasting apparatus for high power hot cathode fluorescent lamps comprising a first separately housed device having a high reactance transformer with primary, secondary and heating windings and having a capacitor connected in series with said secondary winding, a second separately housed device including a high reactance transformer having primary and secondary windings, said transformers having approximately the same leakage reactance, and leads extending between said devices and connecting said primary windings directly in parallel with one another and connecting said secondary windings directly in parallel with one another.

8. Ballasting apparatus of claim 7 wherein the primary windings of each transformer are connected in series with the secondary windings thereof to form autotransformer connections.

9. Ballasting apparatus for high power hot cathode fluorescent lamps comprising a first separately housed reactive device including a high reactance transformer having primary, secondary and heating windings and a capacitor connected in series with its secondary winding, a second separately housed reactive device including a high reactance transformer having primary and secondary windings, and leads extending between said devices and connecting said primary windings directly in parallel with one another and connecting said secondary windings in series with one another and with said capacitor.

10. The ballasting apparatus of claim 9 wherein the transformer of said first device has an isolated secondary winding and the transformer of said second device has its primary winding connected in series with its secondary winding to form an autotransformer.

11. Ballasting apparatus for a pair of serially connected high power hot cathode fluorescent lamps comprising a first separately housed reactive device including a high reactance transformer, a power factor correcting capacitor, and a starting capacitor, said transformer having a primary winding, a secondary winding and a plurality of heating windings having external leads for connection to the lamp cathodes, said power factor correcting capacitor being connected in series with said secondary winding and said starting capacitor being connected between two of said heating windings, a second separately housed reactive device including a high reactance transformer having a primary winding and a secondary winding, and leads extending between said devices and connecting said primary windings directly in parallel with one another and connecting said secondary windings in circuit with one another to deliver their combined electrical outputs to said power factor correcting capacitor.

12. The ballasting apparatus of claim 11 wherein said secondary windings are connected directly in parallel with one another.

13. The ballasting apparatus of claim 11 wherein said secondary windings are connected in series with one another and with said power factor correcting capacitor.

References Cited in the file of this patent

UNITED STATES PATENTS

| | | |
|---|---|---|
| 2,504,548 | Lemmers | Apr. 18, 1950 |
| 2,507,101 | Hall | May 9, 1950 |
| 2,620,459 | Sawyer | Dec. 2, 1952 |
| 2,774,917 | Passmore | Dec. 18, 1956 |
| 2,796,554 | Strecker | June 18, 1957 |
| 2,869,037 | Brooks | Jan. 13, 1959 |